(12) United States Patent
Rummel

(10) Patent No.: US 11,132,515 B2
(45) Date of Patent: Sep. 28, 2021

(54) METHOD FOR AT LEAST PARTIALLY AUTOMATICALLY TRANSFERRING A WORD SEQUENCE COMPOSED IN A SOURCE LANGUAGE INTO A WORD SEQUENCE IN A TARGET LANGUAGE

(71) Applicant: CLAAS Selbstfahrende Erntemaschinen GmbH, Harsewinkel (DE)

(72) Inventor: Ute Rummel, Harsewinkel (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 268 days.

(21) Appl. No.: 16/321,787

(22) PCT Filed: Jul. 24, 2017

(86) PCT No.: PCT/IB2017/000862
§ 371 (c)(1),
(2) Date: Jan. 29, 2019

(87) PCT Pub. No.: WO2018/073635
PCT Pub. Date: Apr. 26, 2018

(65) Prior Publication Data
US 2021/0081618 A1 Mar. 18, 2021

(30) Foreign Application Priority Data
Aug. 2, 2016 (DE) .......................... 102016114265.4

(51) Int. Cl.
*G06F 40/58* (2020.01)
*G06F 40/284* (2020.01)
*G06F 40/30* (2020.01)

(52) U.S. Cl.
CPC ............ *G06F 40/58* (2020.01); *G06F 40/284* (2020.01); *G06F 40/30* (2020.01)

(58) Field of Classification Search
CPC ...... G10L 15/065; G10L 15/26; G10L 15/063; G10L 15/16; G10L 15/183; G06F 40/58; G06F 40/284; G06F 40/30; G06N 3/08
See application file for complete search history.

(56) References Cited

U.S. PATENT DOCUMENTS 9,245,278 B2 * 1/2016 Orsini ................... G06F 40/242
9,400,786 B2 * 7/2016 Lancaster ............... G06F 40/40
(Continued)

FOREIGN PATENT DOCUMENTS

WO WO2015113578 A1 8/2015

OTHER PUBLICATIONS

Tsunakawa, Takashi, and Hiroyuki Kaji. "Augmenting a Bilingual Lexicon with Information for Word Translation Disambiguation." Proceedings of the Eighth Workshop on Asian Language Resouces. 2010. pp. 30-37.

*Primary Examiner* — Mohammad K Islam
(74) *Attorney, Agent, or Firm* — Lempia Summerfield Katz LLC

(57) ABSTRACT

A method and a data processing device are disclosed for at least partially automatically transferring a word sequence composed in a source language into a word sequence in a target language with corresponding substantive content. By analyzing the word sequence and identifying terms with lexical ambiguity in the word sequence by comparing with a terminology database comprising terms with lexical ambiguity in the source language which are assigned a plurality of term identifiers depending on their number of meanings, an unambiguous term definition is provided for translating the word sequence into the target language by assigning a term identifier to the term with lexical ambiguity in the (Continued)

source language. This may render a machine translation less susceptible to errors.

20 Claims, 3 Drawing Sheets

(56) References Cited

U.S. PATENT DOCUMENTS

| | | | | |
|---|---|---|---|---|
| 9,418,655 B2* | 8/2016 | Yassa | ............... | G06F 40/58 |
| 9,471,568 B2* | 10/2016 | Kamatani | ............ | G10L 15/005 |
| 9,477,652 B2* | 10/2016 | Huang | ............... | G06F 40/35 |
| 9,483,461 B2* | 11/2016 | Fleizach | ............ | G06F 40/263 |
| 9,582,489 B2* | 2/2017 | McAteer | ............ | G06F 40/232 |
| 9,734,142 B2* | 8/2017 | Huang | ............... | G06F 40/117 |
| 9,864,744 B2* | 1/2018 | Eck | ............... | G06F 40/45 |
| 10,354,650 B2* | 7/2019 | Gruenstein | ............ | G10L 15/26 |
| 10,402,500 B2* | 9/2019 | Chochowski | ............ | G10L 17/00 |
| 10,824,820 B2* | 11/2020 | Ahn | ............... | G06F 40/58 |
| 2009/0132233 A1* | 5/2009 | Etzioni | ............ | G06F 16/951 |
| | | | | 704/3 |
| 2009/0210213 A1* | 8/2009 | Cannon | ............ | G06F 40/58 |
| | | | | 704/2 |
| 2011/0046940 A1* | 2/2011 | Tanaka | ............ | G06F 40/58 |
| | | | | 704/2 |
| 2011/0202512 A1 | 8/2011 | Pantanelli | | |
| 2012/0173222 A1* | 7/2012 | Wang | ............ | G06F 40/232 |
| | | | | 704/2 |
| 2013/0060559 A1* | 3/2013 | Ryu | ............ | G06F 40/58 |
| | | | | 704/3 |
| 2013/0132069 A1* | 5/2013 | Wouters | ............ | G10L 13/06 |
| | | | | 704/8 |
| 2013/0144597 A1* | 6/2013 | Waibel | ............ | G06F 40/58 |
| | | | | 704/2 |
| 2013/0238339 A1* | 9/2013 | Fleizach | ............ | G10L 13/033 |
| | | | | 704/260 |
| 2013/0346077 A1* | 12/2013 | Mengibar | ............ | G06F 16/3346 |
| | | | | 704/235 |
| 2014/0187210 A1* | 7/2014 | Chang | ............ | H04M 3/568 |
| | | | | 455/414.1 |
| 2014/0365200 A1* | 12/2014 | Sagie | ............ | G06F 40/51 |
| | | | | 704/2 |
| 2015/0081270 A1* | 3/2015 | Kamatani | ............ | G06F 40/58 |
| | | | | 704/2 |
| 2015/0154183 A1* | 6/2015 | Kristjansson | ............ | G10L 13/00 |
| | | | | 704/3 |
| 2015/0170642 A1* | 6/2015 | Peng | ............ | G10L 15/187 |
| | | | | 704/235 |
| 2015/0363388 A1* | 12/2015 | Herdagdelen | ............ | G06Q 10/10 |
| | | | | 704/2 |
| 2016/0162575 A1* | 6/2016 | Eck | ............ | G06F 40/58 |
| | | | | 707/776 |
| 2016/0179774 A1* | 6/2016 | McAteer | ............ | G06F 40/232 |
| | | | | 704/9 |
| 2016/0357731 A1* | 12/2016 | Zorzin | ............ | G06F 40/232 |
| 2017/0025120 A1* | 1/2017 | Dayan | ............ | G06F 16/3335 |
| 2017/0083504 A1* | 3/2017 | Huang | ............ | G06F 40/117 |
| 2017/0148432 A1* | 5/2017 | Jaramillo | ............ | G10L 15/22 |
| 2018/0047395 A1* | 2/2018 | Sommers | ............ | G06F 40/58 |
| 2018/0067927 A1* | 3/2018 | Gadepalli | ............ | G06F 3/04842 |
| 2018/0143956 A1* | 5/2018 | Skarbovsky | ............ | G10L 15/26 |
| 2018/0233150 A1* | 8/2018 | Gruenstein | ............ | G10L 15/26 |
| 2018/0329894 A1* | 11/2018 | Zhao | ............ | G06F 40/58 |
| 2020/0020320 A1* | 1/2020 | Lee | ............ | G10L 15/065 |
| 2020/0043498 A1* | 2/2020 | Chae | ............ | G10L 15/26 |
| 2020/0143793 A1* | 5/2020 | Saeki | ............ | G06F 40/47 |
| 2020/0193971 A1* | 6/2020 | Feinauer | ............ | G10L 17/02 |
| 2020/0193972 A1* | 6/2020 | Feinauer | ............ | G06N 20/10 |
| 2020/0226327 A1* | 7/2020 | Matusov | ............ | G06F 40/42 |
| 2020/0250383 A1* | 8/2020 | Cheng | ............ | G06F 40/44 |
| 2020/0285699 A1* | 9/2020 | Nogima | ............ | G06F 40/35 |
| 2020/0311211 A1* | 10/2020 | Beck | ............ | G10L 15/005 |
| 2020/0335100 A1* | 10/2020 | Saon | ............ | G10L 15/07 |
| 2020/0387677 A1* | 12/2020 | Kim | ............ | G06F 40/47 |

* cited by examiner

METHOD FOR AT LEAST PARTIALLY AUTOMATICALLY TRANSFERRING A WORD SEQUENCE COMPOSED IN A SOURCE LANGUAGE INTO A WORD SEQUENCE IN A TARGET LANGUAGE

CROSS REFERENCE TO RELATED APPLICATIONS

This is a U.S. national stage application under 37 U.S.C. 371 of PCT Application No. PCT/IB2017/000862 (published as WO 2018/073635 A1), which claims priority to German Patent Application No. DE 102016114265.4 (filed Aug. 2, 2016), the entire disclosure of both of which are hereby incorporated herein by reference.

BACKGROUND

In translating a text in a source language formed from a word sequence, or a plurality of word sequences, into a word sequence in a target language with corresponding substantive meaning, it is important to discern the context of the word sequence in order to avoid linguistic misunderstandings. Linguistic misunderstandings generally originate from a misinterpretation of an individual term in a word sequence that is ascribed different substantive meanings in the source language depending on the context in which this term is used. In this context, one speaks of a homonymous or polysemous term, or a term with lexical ambiguity. The German term "Verletzung" is cited as an example of this which can be interpreted differently in a translation into English. The German term "Verletzung" can inter alia be translated into English as "injury" or "infringement". Whereas the term "injury" in a medical context is understood to be the presence of physical injury to a living creature, the term "infringement" in a legal context is used as a legal infringement from an action of a third party. A method or a data processing device for at least partially automatically transferring a word sequence composed in a source language into a word sequence with corresponding substantive meaning in a target language is, in contrast to a human translator, incapable, or only partially capable, of discerning the context of a word sequence in the source language in which the term is used so that it can be assigned the correct term in the target language. Correspondingly, an automatic translation requires a revision by a human translator in order to eliminate and prevent substantive misunderstandings. This holds true in particular for translations in sensitive fields such as technical documentations.

A method as well as a data processing device of the aforementioned type are known from EP 0 737 928 A1.

SUMMARY

In one implementation, a method for at least partially automatically transferring a word sequence composed in a source language into a word sequence in a target language with corresponding substantive meaning is disclosed.

In another implementation, a data processing device for automatically transferring a word sequence composed in a source language into a word sequence in a target language with corresponding substantive content is disclosed.

In one implementation, the method and data processing device of the aforementioned type is configured to reduce susceptibility to error and increase processing speed. This may be achieved by the method of at least partially automatically transferring a word sequence composed in a source language into a word sequence in a target language with corresponding substantive meaning and may be achieved by the data processing device that automatically transfers a word sequence composed in a source language into a word sequence in a target language with corresponding substantive content.

Other aspects are disclosed in the subject matter of the dependent claims.

In one implementation, a method is disclosed for at least partially automatically transferring a word sequence composed in a source language into a word sequence in a target language with corresponding substantive meaning that is characterized by the following method steps:

a) entering the word sequence composed in the source language;
b) analyzing the word sequence and identify terms with lexical ambiguity in the word sequence in a comparison with a terminology database comprising terms with lexical ambiguity in the source language which are assigned a plurality of term identifiers depending on their number of meanings;
c) selecting a term identifier depending on the context of the word sequence composed in the source language;
d) selecting a term in the target language corresponding to the selected term identifier;
e) translating the terms with lexical ambiguity in the word sequence into the target language; and
f) outputting the word sequence in the target language.

The word sequence to be translated, which can be composed of a single term or a plurality of terms, is entered by providing the word sequence, for example, as an existing electronic document, or recording word sequence by means of a text recognition program, or providing word sequence in another way as a computer-readable text, for example by typing using a keyboard. The individual term or the terms of the entered word sequence may be automatically analyzed, and the presence of one or more terms with lexical ambiguity may be identified in a comparison with a terminology database comprising terms of lexical ambiguity in the source language. The terms with lexical ambiguity in the terminology database may be assigned a plurality of term identifiers depending on their number of meanings. The term identifier may always be configured as a sequential numbering that stands for the number of different meanings of a term with lexical ambiguity. The term identifier may be selected depending on the context of the word sequence composed in the source language. Based on the selection of the selected term identifier, the corresponding term is determined in the target language. With the awareness of the contextually-oriented substantive meaning of the term with lexical ambiguity in the target language, the remaining terms with lexical ambiguity in the word sequence composed in the source language may then be translated into the target language. Subsequently, the word sequence transferred into the target language is output. Thus, by assigning the term identifier to the term with lexical ambiguity in the source language, an unambiguous term definition is available for translating the word sequence into the target language. This may render a translation less error-prone, which may lead to a significant reduction of revision.

In one implementation, the entered word sequence may be composed in the source language and the word sequence output in the target language may be saved as separate electronic documents. This may enable an easy exchange of data, as well as easy further processing or editing of the composed or generated word sequence.

In one implementation, the respective term identifier may be assigned as a machine-readable label to the identified term composed in the source language with lexical ambiguity. Thus, when subsequently reviewing the source text, it is readily feasible to retain the specific meaning within a word sequence that is assigned to the identified term with lexical ambiguity.

In particular, the respective term identifier may be assigned as a machine-readable label to the term selected in the source language as a translation of the term with lexical ambiguity. This allows a person, who reviews the content of the word sequence transferred into the target language, to understand the undertaken selection of the term identifier. A person assigned with the translation of the word sequence may automatically receive additional information, which may increase the quality of the translation. A person who reads the word sequence translated into the target language may thereby receive additional information, which renders the translated words sequence more comprehensible.

Moreover, the respective label may be embedded in the saved document as a logical link to the term with lexical ambiguity that is saved in the terminology database. This may simplify visualization of the selected meaning of the term with lexical ambiguity. Accordingly, a direct access to the entry in the terminology database corresponding to the term identifier can be enabled by the logical link. In particular, by means of the assigned term identifier, the respective meaning can be depicted in the form of text and/or in graphic form. The logical link can for example be realized in the form of a so-called hyperlink that is embedded in the text of the electronic document in the selection of the term identifier.

In one implementation, the respective label can be shown and/or hidden within the electronic document by means of a filter function. This may allow the legibility of the text of the electronic document to be increased. Moreover, the saved electronic document can be converted into different file formats for subsequent further processing, wherein the labels assigned to the respective term with lexical ambiguity are retained. The link between the term with lexical ambiguity, the term identifier and the meaning saved in the terminology database may thereby be retained in order to be able to maintain the selected assignment of the term identifier during the translation process.

This may assist in the translation when at least one key word to determine the context of the word sequence is saved. Upon entering the word sequence to be transferred, at least one keyword can be entered or linked thereto which can be used in automatically selecting the term identifier depending on the context of the word sequence composed in the source language. This allows the automation of the method to be expanded. In this context, the at least one keyword can lead to a reduction of the selectable term identifiers available for a term with lexical ambiguity.

Alternatively or in addition, a request for manually assigning the label can be output during the identification of a term with lexical ambiguity within the word sequence. A person entering the word sequence composed in the source language may be made aware of the presence of a term with lexical ambiguity by means of an automatically generated reference, and may be requested to correspondingly select a term from the number of terms that are provided by means of the terminology database. In this context while entering the word sequence composed in the source language, the identified term with lexical ambiguity can be assigned the term identifier, corresponding to the context, that is assigned as a machine-readable label to the identified term with lexical ambiguity within the entered electronic document.

In one implementation, the terms with lexical ambiguity in the source language can be compared with a terminology database comprising terms of lexical ambiguity in the target language. This may be performed given the consideration that an unambiguous term with substantive meaning in the source language can be a term with lexical ambiguity in the target language so that its interpretation can be misleading when reading the translated text in the target language.

In so doing, a term identifier can be assigned to a term with lexical ambiguity in the source language if the corresponding one in the target language is a term with lexical ambiguity. In this regard, the term identifier can reference the terminology database of the target language. In this manner, it can provide that terms with lexical ambiguity in the source language that are terms with lexical ambiguity in the target language are assigned a translation in the target language corresponding to the substantive meaning of the term.

Thus, by assigning term identifiers, a subsequent revision of the electronic documents in the source language as well as in the target language is possible. In particular, term identifiers can be added afterwards. Further, terms with lexical ambiguity used in a word sequence can be automatically filtered out and exported. Accordingly, the electronic documents in the source and target language can also be exchanged without a link to the respective terminology database.

In one implementation, a data processing system or device is disclosed for automatically transferring a word sequence composed in a source language into a word sequence in a target language with corresponding substantive content comprising:

an entering device configured to enter the word sequence composed in the source language (e.g., an apparatus for entering the word sequence composed in the source language);

a memory device in which a terminology database is saved that comprises terms with lexical ambiguity in the source language to which a plurality of term identifiers are assigned depending on their number of meanings;

a processing device that is configured to analyze the entered word sequence and the identification of terms with lexical ambiguity in the word sequence by comparing the terms with lexical ambiguity with terms in the terminology database; and an output device configured to output the word sequence in the target language (e.g., an apparatus for outputting the word sequence in the target language), wherein the processing device is configured to select a term identifier depending on a context of the word sequence composed in the source language, wherein the processing device is configured to select a term in the target language corresponding to the selected term identifier, and wherein the processing device is configured to translate the terms with lexical ambiguity in the word sequence into the target language.

The apparatus for inputting the word sequence composed in the target source language is configured such that the word sequence can be input directly or indirectly. Input by means of a keyboard may be considered direct input, e.g., an operator types in a word sequence. Alternatively, the input can be performed by means of an optomechanical device by means of which the word sequence is detected as a graphic and converted into machine-readable data. By optical character recognition, the graphic is converted into a sequence of characters that are combined in an electronic document. The transmission of an electronic document from a computer, independent of its origin, by means of a network to the apparatus for entry into the data processing device may be considered indirect entry.

The terminology database comprising terms of lexical ambiguity in the source language may be saved in the memory device. The terms with lexical ambiguity are assigned a plurality of term identifiers depending on their number of meanings. In addition, the memory device serves, inter alia, as a memory for the entered word sequences, or electronic documents.

The entered word sequence may be analyzed with regard to the presence of terms of lexical ambiguity by means of the processing device that is configured to analyze the entered word sequence and the identification of terms with lexical ambiguity in the word sequence in a comparison with the terms with lexical ambiguity in the terminology database. For this, the processing device accesses the terminology database with the terms with lexical ambiguity contained in the source language in order to identify terms with lexical ambiguity within a word sequence.

The processing device may be configured to select a term identifier depending on a context of the word sequence composed in the source language. Depending on the context of the word sequence composed in the source language, the corresponding term identifier is selected in order to ascribe to the identified term with lexical ambiguity in the word sequence its meaning corresponding to the context. The selection can for example be automated using one or more keywords that are added to the entered word sequence. Alternatively, there is a targeted selection by a person entering the word sequence in response to an automatically generated request. This request may be output by the processing device for each identified term with lexical ambiguity in the word sequence.

Moreover, the processing device is configured to translate terms with lexical ambiguity in the word sequence into the target language.

The transferred word sequence is provided by means of an apparatus for outputting the word sequence in the target language.

The present invention is explained in greater detail below with reference to exemplary embodiments shown in the drawings.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Figure 1:
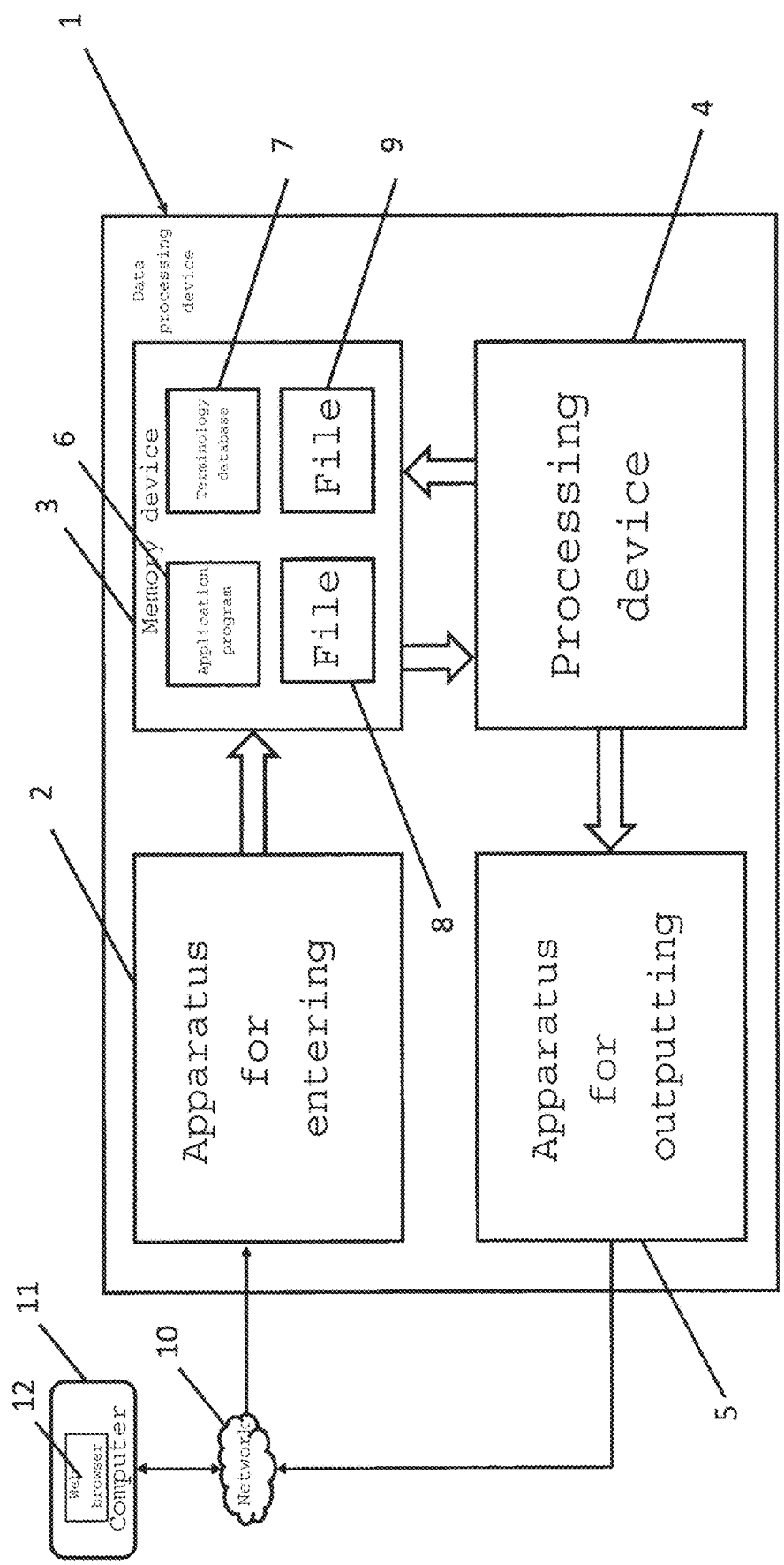
FIG. 1 shows a schematic representation of a data processing device.

The representation in FIG. 1 shows a schematic representation of a data processing device 1 that is configured to automatically transfer a word sequence composed in a source language into a word sequence in a target language with corresponding substantive content.

The data processing device 1 comprises an apparatus for entering 2 a word sequence composed in a source language, a memory device 3, a processing device 4, as well as an apparatus for outputting 5 the word sequence in a target language. An application programming interface (API) is provided as the apparatus for entering 2 which has access to a network 10, such as the Internet, in order to work with a corresponding application, or another device serving to enter data such as a keyboard, scanner, data carrier or the like. The memory device 3 may be used for the non-volatile saving of one some or all of: one or more application programs 6; at least one terminology database 7; the word sequence entered in the source language; or the word sequence transferred into the target language, as a file 8, 9. The number of needed terminology databases 7 may be oriented around the number of source and target languages into which word sequences are to be entered. The processing device 4 may include one or more processors that are configured to run application programs. The processing device 4 may exchange data bidirectionally with the memory device 3. The apparatus for outputting 5 may also be designed as an application programming interface (API). Alternatively or in addition, the apparatus for outputting 5 can, for example, be an apparatus serving as a screen, printer, or other apparatus serving to output data.

A word sequence may be input by means of the apparatus for inputting 2 designed as a programming interface of the data processing device 1 in the depicted exemplary implementation by an application program, such as in the simplest case a web browser 12, provided on a computer 11 that is configured in a decentralized manner.

Figure 2:
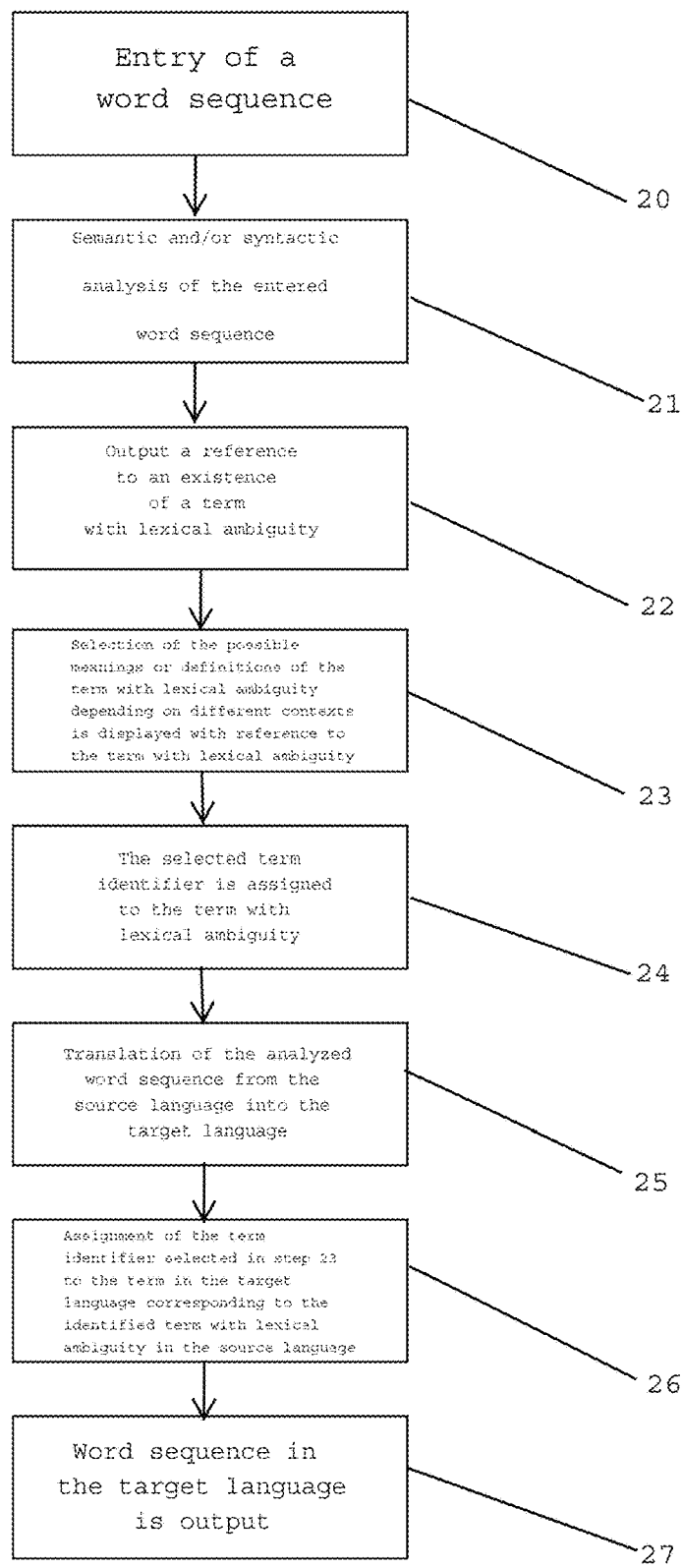
FIG. 2 shows one example flowchart of a method for automatically transferring a word sequence composed in a source language into a word sequence in a target language with corresponding substantive content.

FIG. 2 portrays one example flowchart of a method for automatically transferring a word sequence composed in a source language into a word sequence in a target language with corresponding substantive content. In this case, at least the source language of the entered word sequence can be automatically recognized in a corresponding analysis by means of the processing device. In general, the source language and the target language may, however, be given.

At step 20, there is the entry of a word sequence comprising or consisting of at least one word, with the entry via the apparatus for entering 2. The word sequence entered in a source language may be saved as a file 8 in the memory device 3.

In a subsequent step 21, there is the semantic and/or syntactic analysis of the entered word sequence by the processing device 4. For this, the entered word sequence may be read in from the memory device 3 by the processing device 4. In this context, the analysis may comprise the checking of the word sequence for the presence of at least one term with lexical ambiguity. An example of a term with lexical ambiguity is the German word "Tau" which can mean a rope, the morning dew, or a letter of the Greek alphabet. Thus, one example of an indication of a term with lexical ambiguity comprises a term with more than one meaning. The processing of the entered word sequence may be performed sequentially. The analysis of the word sequence and the at least one identified term with lexical ambiguity in the word sequence may be performed using a comparison with the terminology database 7 in the memory device 3, including comparing terms with lexical ambiguity in the source language. Thus, the terminology database 7 may include terms that are identified as having lexical ambiguity in the source language (e.g., the term "Tau").

If, in the context of the analysis, at least one term in the entered word sequence with lexical ambiguity is identified in step 21, a reference to an existence of a term with lexical ambiguity is output in a following step 22. In one implementation, this may be performed by outputting on computer 11, which may also be the device in which the word sequence in the source language to be transferred is entered. Associated with this may be the request to define the term with lexical ambiguity with regard to its meaning in the context of the word sequence.

For this, in step 23, a selection of the possible meanings or definitions of the term with lexical ambiguity depending on different contexts is displayed with reference to the term with lexical ambiguity identified in the comparison with the terminology database 7 that is assigned a plurality of term indicators depending on its number of meanings. The selection may be displayed on the computer 11 by means of the web browser 12. Corresponding to the example of the German term "Tau" indicated above that has three different meanings, the number of meanings of the term with lexical ambiguity, "Tau", corresponds to the value three, so that the term is assigned three term identifiers. The term identifier that corresponds to the context of the entered word sequence is selected from this portrayed example that can be a simple tabular list of the different meanings up to an output of text combined with a graphic illustration.

In the following step 24, this selected term identifier may be assigned to the term with lexical ambiguity. This assignment of the specific term identifier may be saved in the file 8 that contains the word sequence in the source language. For this, the respective term identifier may be assigned to the identified term composed in the source language with lexical ambiguity as a machine-readable label.

In the following step 25, there may be a translation of the analyzed word sequence from the source language into the target language. For this, on the one hand there may be the selection of a term in the target language corresponding to the selected term identifier, and on the other hand, the translation may be performed for the terms with lexical ambiguity in the word sequence in the target language so that a word sequence with corresponding substantive content is generated. Thus, in one implementation, the selection of the term in the target language may be the same as the selected term identifier in the source language (e.g., the selected term in the target language for "Bremse", discussed below, is "an assembly for stopping a movement"). In another implementation, the selection of the term in the target language may be different from the selected term identifier in the source language (e.g., the selected term in the target language for "Bremse" is not "an assembly for stopping a movement" but "brake").

Subsequently in step 26, there may be the assignment of the term identifier selected in step 23 to the term in the target language corresponding to the identified term with lexical ambiguity in the source language. The respective term identifier by means of which the term in the target language was selected, may also be assigned as a machine-readable label to the corresponding term in the target language. The translation of the word sequence into the target language may be saved together with the assigned label(s) in the file 9. On the one hand, this assignment may enable access to the terminology database 7 at a later time, e.g., the retrieval and portrayal of the identified term with lexical ambiguity in the source language and its meaning, and the term in the target language resulting from the selection of the term identifier. This representation can also be a simple tabular list up to a text output combined with a graphic illustration of the meaning.

Finally, in step 27, the word sequence in the target language may be output. The output may be performed by the web browser 12 according to the selected exemplary implementation.

Figure 3:
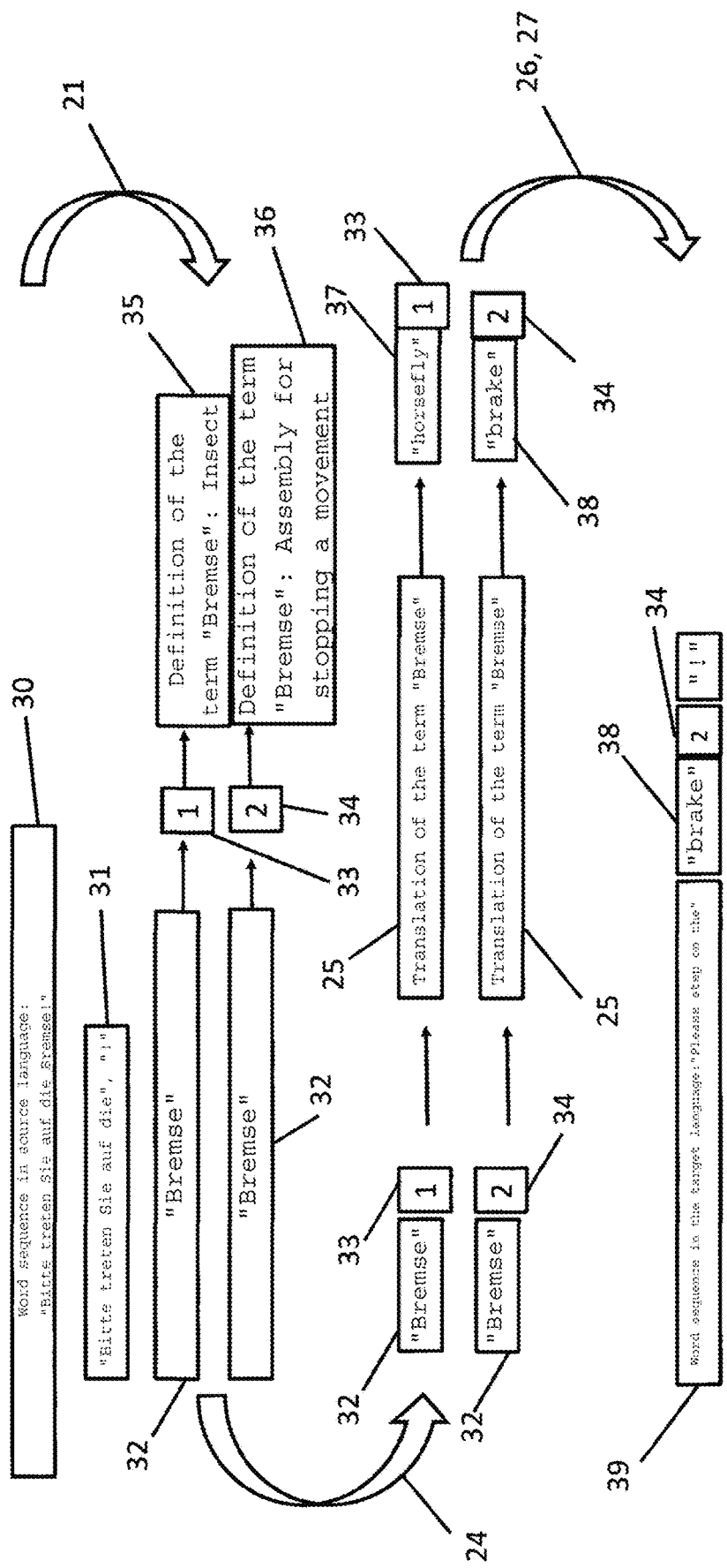
FIG. 3 shows an illustration of the method with reference to a specific example of a word sequence.

FIG. 3 illustrates the method with reference to a specific example of a word sequence. In this case, a word sequence 30 transmitted to the data processing device 1 and composed in the source language comprises the individual terms "Bitte treten Sie auf die Bremse". This word sequence composed in an HTML format may be entered by means of an apparatus for entering 2 in the data processing device 1 for further processing. During the analysis of the word sequence in step 21, the term with lexical ambiguity 32 "Bremse" is identified in addition to the terms with lexical ambiguity 31 "Bitte treten Sie auf die". The terminology database 7 has two additional meanings 35, 36 for this term "Bremse" with lexical ambiguity 32 so that two term identifiers 33, 34 are assigned. The term identifiers 33, 34 constitute a key in the terminology database 7.

Due to the identification of a term with lexical ambiguity 32, the word sequence 30 composed in the source language is requested for selecting one of the term identifiers 33, 34 for the term "Bremse" depending on the context. In the following exemplary implementation, the term with lexical ambiguity 32, "Bremse" lies within the context of an assembly for stopping movement and does not relate to an insect. The definition of the term with lexical ambiguity 32, "Bremse", as an insect is assigned to the term identifier 33. The term identifier 34 is assigned to the definition of the term with lexical ambiguity 32, "Bremse", as an assembly for stopping a movement.

Correspondingly, the term identifier 34 is selected according to the context of the word sequence. The selection may be performed manually by an operator, or automated as previously described above. The assignment of the selected term identifier 34 to the term with lexical ambiguity 32 in the source language may be performed in step 24 as previously noted. By selecting the term identifier 34, the word sequence with corresponding substantive content in the target language may be established. Accordingly, the term 38 "brake" and not the corresponding English term 37 "horsefly" is selected for translating the term with lexical ambiguity 32 "Bremse". Thus, the term for "an assembly for stopping a movement" may be correlated to the term "brake" in the target language, so that the term "brake" may be retained in the word sequence for output. The term identifier 34 is assigned to the selected term 38 and is retained in the word sequence 39 to be output in the target language. This is performed in steps 26 and 27.

LIST OF REFERENCE NUMBERS

1 Data processing device
2 Apparatus for entering

3 Memory device
4 Processing device
5 Apparatus for outputting
6 Application program
7 Terminology database
8 File
9 File
10 Network
11 Computer
12 Web browser
20 Step
21 Step
22 Step
23 Step
24 Step
25 Step
26 Step
27 Step
30 Word sequence in source language
31 Term with lexical ambiguity
32 Term with lexical ambiguity
33 Term identifier
34 Term identifier
35 Meaning of 32
36 Meaning of 32
37 English term
38 English term
39 Word sequence in the target language The methods, devices, processing, circuitry, and logic described above may be implemented in many different ways and in many different combinations of hardware and software. As discussed above, the system may include the processing device 4, which may include one or more processors and the memory device 3. These are merely one example of a computational configuration. Other types of computational configurations are contemplated. For example, all or parts of the implementations may be circuitry that includes a type of controller, including as an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings, such as FIGS. 2-3.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for at least partially automatically transferring a source language word sequence composed in a source language into a target language word sequence in a target language with corresponding substantive content, the method comprising:

entering the source language word sequence composed in the source language;

analyzing the source language word sequence and identifying at least one term with lexical ambiguity in the source language word sequence by comparing with a terminology database comprising terms with lexical ambiguity in the source language in order to identify a plurality of meanings for the at least one term;

assigning a term identifier to one of the plurality of meanings for the at least one term in such a way that the one of the plurality of meanings for the at least one term is assigned exactly one term identifier, with the term identifier serving as a key in the terminology database for translating the at least one term;

selecting the term identifier depending on context of the source language word sequence composed in the source language, wherein the selection of the term identifier is performed manually or automatically;

storing so that the term identifier is assigned to the at least one term as a machine-readable label;

in translating the source language word sequence, parsing to identify the term identifier that is assigned to the at least one term;

using the term identifier as the key to the terminology database in order to obtain a corresponding target language translation term of the at least one term as part of generating a target language word sequence;

storing so that the term identifier is assigned to the corresponding target language translation term as a machine-readable label for later use in accessing the terminology database; and outputting the target language word sequence in the target language.

2. The method of claim 1, wherein the source language word sequence composed in the source language and the target language word sequence in the target language are saved as separate electronic documents.

3. The method of claim 2, wherein the respective label is embedded in the saved electronic document as a logical link to the identified term with lexical ambiguity that is saved in the terminology database.

4. The method of claim 3, wherein the respective label is shown or hidden within the saved electronic document using a filter function.

5. The method of claim 4, wherein the saved electronic document is converted into different file formats for subsequent further processing; and
wherein the labels assigned to the respective term with lexical ambiguity are retained.

6. The method of claim 5, wherein at least one key word is saved to determine the context of the word sequence composed in the source language.

7. The method of claim 5, wherein a request for manually assigning the label is output responsive to identifying the term with lexical ambiguity within the word sequence.

8. The method of claim 7, wherein the term identifier is assigned to a term with lexical ambiguity in the source language responsive to determining that the corresponding one in the target language is a term with lexical ambiguity.

9. A data processing system for automatically transferring a source language word sequence composed in a source language into a target language word sequence in a target language with corresponding substantive content, the data processing system comprising:
an entering device configured to enter the source language word sequence composed in the source language;
a memory device configured to store a terminology database that comprises terms with lexical ambiguity in the source language to which a plurality of term identifiers are assigned depending on their number of meanings;
a processing device configured to analyze the entered word sequence and identify at least one term with lexical ambiguity in the source language word sequence in a comparison with the identified terms with lexical ambiguity in the terminology database; and
an output device configured to output the target language word sequence in the target language,
wherein the processing device is configured to:
assign a term identifier to one of a plurality of meanings for the at least one term in such a way that the one of the plurality of meanings for the at least one term is assigned exactly one term identifier, with the term identifier serving as a key in the terminology database for translating the at least one term;
select the term identifier depending on a context of the source language word sequence composed in the source language, wherein the selection of the term identifier is performed manually or automatically,
store so that the term identifier is assigned to the at least one term as a machine-readable label;
in translating the source language word sequence, parse to identify the term identifier that is assigned to the at least one term;
use the term identifier as the key to the terminology database in order to obtain a corresponding target language translation term of the at least one term as part of generating a target language word sequence;
store so that the term identifier is assigned to the corresponding target language translation term as a machine-readable label for later use in accessing the terminology database; and
output the target language word sequence in the target language.

10. The data processing system of claim 9, wherein the processing device is configured to save the source language word sequence composed in the source language and the target language word sequence in the target language as separate electronic documents.

11. The data processing system of claim 10, wherein the processing device is configured to embed the respective label in the saved electronic document as a logical link to the term with lexical ambiguity that is saved in the terminology database.

12. The data processing system of claim 11, wherein the processing device is configured to show or hide the respective label within the saved electronic document using a filter function.

13. The data processing system of claim 12, wherein the processing device is configured to convert the saved electronic document into different file formats for subsequent further processing; and
wherein the processing device is configured to retain the labels assigned to the respective term with lexical ambiguity.

14. The data processing system of claim 13, wherein the processing device is configured to save at least one key word to determine the context of the word sequence composed in the source language.

15. The data processing system of claim 13, wherein the processing device is configured to cause the output device to output a request for manually assigning the label responsive to the processing device identifying a term with lexical ambiguity within the word sequence.

16. The method of claim 1, wherein using the term identifier as the key to the terminology database in order to obtain a corresponding target language translation term of the at least one term as part of generating the target language word sequence comprises:
accessing the terminology database using the term identifier in order to obtain a translation of the at least one term; and
selecting the corresponding target language translation term to be identical to the translation of the at least one term.

17. The method of claim 1, wherein using the term identifier as the key to the terminology database in order to obtain a corresponding target language translation term of the at least one term as part of generating the target language word sequence comprises:
accessing the terminology database using the term identifier in order to obtain a translation of the at least one term; and
selecting the corresponding target language translation term to be different from the translation of the at least one term.

18. The method of claim 1, wherein storing so that the term identifier is assigned to the corresponding target language translation term as the machine-readable label for later use in accessing the terminology database comprises storing the machine-readable label associated with the corresponding target language translation term in a file so that the machine-readable label is used for later access of the terminology database.

19. The method of claim 1, further comprising using the machine-readable label associated with the corresponding target language translation term for a tabular list of text output combined with a graphic illustration of the meaning associated with the assigned term identifier.

20. The method of claim 1, wherein the term identifier assigned to the at least one term is retained in the target language word sequence for output of the term identifier along with the target language word sequence in the target language.

* * * * *